United States Patent
Kara-Ivanov et al.

(10) Patent No.: US 10,097,348 B2
(45) Date of Patent: Oct. 9, 2018

(54) DEVICE BOUND ENCRYPTED DATA

(71) Applicant: Samsung Electronics Co., Ltd., Suwon-si, Gyeonggi-do (KR)

(72) Inventors: Michael Kara-Ivanov, Ramat Gan (IL); Dvir Schirman, Ramat Gan (IL); Shmuel Dashevsky, Ramat Gan (IL); Jun Jin Kong, Yongin-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 176 days.

(21) Appl. No.: 15/080,070

(22) Filed: Mar. 24, 2016

(65) Prior Publication Data
US 2017/0279606 A1 Sep. 28, 2017

(51) Int. Cl.
*G06F 21/74* (2013.01)
*H04L 9/08* (2006.01)
*G06F 12/02* (2006.01)
*H04L 9/32* (2006.01)

(52) U.S. Cl.
CPC ........ *H04L 9/0838* (2013.01); *G06F 12/0246* (2013.01); *H04L 9/3226* (2013.01); *H04L 9/3236* (2013.01); *G06F 2212/7201* (2013.01)

(58) Field of Classification Search
CPC ......... G06F 21/64; G06F 21/76; H04L 9/3278
USPC ........... 713/180–185; 714/784; 380/255, 266
See application file for complete search history.

(56) References Cited

U.S. PATENT DOCUMENTS

| | | | |
|---|---|---|---|
| 6,498,851 B1* | 12/2002 | Wong | H04K 1/00 380/266 |
| 7,240,208 B1* | 7/2007 | Oakley | H04L 9/0897 348/207.99 |
| 8,290,150 B2 | 10/2012 | Erhart et al. | |
| 8,438,394 B2 | 5/2013 | Etchegoyen et al. | |
| 8,516,269 B1 | 8/2013 | Hamlet et al. | |
| 8,610,454 B2 | 12/2013 | Plusquellic et al. | |
| 8,667,265 B1 | 3/2014 | Hamlet et al. | |
| 8,700,916 B2 | 4/2014 | Bell et al. | |
| 9,432,298 B1* | 8/2016 | Smith | H04L 49/9057 |
| 9,628,868 B2* | 4/2017 | LaBosco | H04N 21/631 |
| 2002/0003885 A1* | 1/2002 | Mead | H04L 9/304 380/269 |
| 2007/0101122 A1* | 5/2007 | Guo | H04L 63/061 713/153 |
| 2009/0282259 A1* | 11/2009 | Skoric | G06F 21/35 713/185 |
| 2010/0199103 A1 | 8/2010 | Van Rilnswou | |
| 2011/0191129 A1* | 8/2011 | Moriya | G06Q 10/063 705/7.11 |
| 2013/0051552 A1 | 2/2013 | Handschuh et al. | |
| 2013/0141137 A1 | 6/2013 | Krutzik et al. | |

(Continued)

*Primary Examiner* — Morshed Mehedi
*Assistant Examiner* — Viral S Lakhia
(74) *Attorney, Agent, or Firm* — Harness, Dickey & Pierce, P.L.C.

(57) ABSTRACT

A method of encrypting unencrypted digital content includes measuring an analog value associated with a physical property of interested cells of a memory array; digitizing the measured analog value to generate a response key; generating an encryption key based at least on the response key; encrypting the unencrypted digital content to generated encrypted digital content based on the encryption key; and storing the encrypted digital content.

17 Claims, 11 Drawing Sheets

(56) References Cited

U.S. PATENT DOCUMENTS

| | | | |
|---|---|---|---|
| 2013/0254636 A1* | 9/2013 | Kirkpatrick | H04L 9/0866 714/784 |
| 2014/0032933 A1 | 1/2014 | Smith et al. | |
| 2014/0068244 A1* | 3/2014 | Oliver | H04L 9/00 713/150 |
| 2014/0068270 A1 | 3/2014 | Shenoy | |
| 2014/0093074 A1 | 4/2014 | Gotze et al. | |
| 2014/0108786 A1 | 4/2014 | Kreft | |
| 2014/0162464 A1* | 6/2014 | Dimitrakopoulos | H01L 21/02225 438/761 |
| 2014/0258736 A1* | 9/2014 | Merchan | G06F 21/62 713/193 |
| 2015/0046699 A1* | 2/2015 | Benteo | G06F 21/32 713/156 |
| 2015/0086016 A1* | 3/2015 | Oshida | H04L 9/3239 380/255 |
| 2015/0234751 A1* | 8/2015 | Van Der Sluis | G06F 12/1408 713/193 |
| 2015/0278551 A1* | 10/2015 | Iyer | G06F 21/70 726/2 |
| 2016/0328578 A1* | 11/2016 | Plusquellic | G06F 7/588 |
| 2016/0364583 A1* | 12/2016 | Benoit | G06F 21/79 |
| 2017/0048072 A1* | 2/2017 | Cambou | H04L 9/3278 |

\* cited by examiner

FIG. 8

> Use hash of the image, document or any other private material as the challenge to the F-PUF device.
>
> Hash:
> 01010110 10010000    00011000 01001000    01101010 00011010    10001000 00001101
>
> Decimal number of the cell in the chosen WL, defined by 16 bits in hash:
> 22160                6216                 27162                34829

Digest of $Hash_1$

> Use the output of the F-PUF device for the cells, defined by the hash of the image or document as the component for AES Key construction
>
> Binary Cell number:
> 01010110 10010000    00011000 01001000    01101010 00011010    10001000 00001101
>
> Extracted Bits:
> 0                    0                    1                    0                    ....
> Helper Data:
> -                    -                    +                    -                    ....

Response Key

> Use the output of the F-PUF device together with hash of User specific information (PIN or Password) in order to calculate the final AES Key
>
> Bits, extracted from F-PUF:
> 0                    0                    1                    0                    ....
> Hash of PIN or Password:
> 1                    0                    0                    1                    ....
>
> AES Key, calculated as the XOR of the two previous components:
> 1                    0                    1                    1                    ....

Encryption Key

```
Encryption Phase - Derive F-PUF Response Key without corresponding Helper Data.

F-PUF Response key:
    01010110 10010000 00011000 01001000 01101010 00011010 10001000 00001101
```

```
                    Decryption Phase without Helper Data.

F-PUF Response Key:
    01010111 11010000 00011100 00001000 01101110 00001010 10001000 00001101

Analysis: Reproduced F-PUF Response Key contains six mistakes
```

```
Encryption Phase - Derive F-PUF Response Key and corresponding Helper Data.

F-PUF Response Key:
01010110 10010000 00011000 01001000 01101010 00011010 10001000 00001101

Helper:
++++++-+ -+-+++-+ ++---+++ +--+++-- -----++- +-+-+--+ -++-+-++ +--++-++
```

```
              Decryption Phase - with Helper Data

Key: 01010110 10010000 00011000 01001000 01101010 00001010 10001000 00001101

Analysis: Reproduced key contains a single mistake
```

DEVICE BOUND ENCRYPTED DATA

BACKGROUND

Electronic communication has the advantage of facilitating the relatively easy transfer of data between electronic devices, for example, via a wired or wireless connection therebetween. However, in some cases, this seamless transfer of data may be undesirable.

For example, a physical or copyright owner of certain data or a subject captured within such data may wish for the data to remain within an authorized electronic device and not be freely transferable to other electronic devices. One such example may be private digital images taken via a digital camera and/or mobile device. While the intrinsic properties of a digital image may conventionally allow the digital image to be freely transferable, the owner or subject captured within such digital images may desire that the images remain within the digital camera and/or mobile device.

Conventional protection scheme may be utilized to protect digital data. Examples of protection schemes include using a key as a digital identifier to authenticate a user with the electronic device and/or encrypt the digital data. However, once authenticated or decrypted, the user may freely transfer the digital data. Further, because such keys may be stored in memory, this digital identifier may be circumvented by a hacker reading the key from the memory, for example, with optical methods or the like.

SUMMARY

At least some example embodiments relate to a method of encrypting unencrypted digital content.

In some example embodiments, the method includes measuring an analog value associated with a physical property of interested cells of a memory array; digitizing the measured analog value to generate a response key; generating an encryption key based at least on the response key; encrypting the unencrypted digital content to generated encrypted digital content based on the encryption key; and storing the encrypted digital content.

In some example embodiments, the method further includes quantizing the measured analog value to generate helper data corresponding to the response key; and storing the helper data.

In some example embodiments, the measuring an analog value includes applying a plurality of voltage pulses to each of the interested cells of the memory array; and determining which one of the plurality of applied voltage pulses turns on respective ones of the interested cells.

In some example embodiments, the memory array is a NAND flash memory array, and the physical property is respective critical number of pulses of the interested cells of the memory array.

In some example embodiments, the method further includes calculating a first hash based on the unencrypted digital content; and selecting the interested cells from the memory array based on the first hash such that the interested cells whose analog voltage is measured are selected based on the unencrypted digital content.

In some example embodiments, the generating an encryption key comprises: receiving one of a password and a personal identification number (PIN) from a user; calculating a second hash based on the one of the password and the PIN; and generating the encryption key by, performing a logical operation between the first hash and the second hash to generate a result, determining the interested cells based on the result, and generating the encryption key based on a response of the interested cells.

At least some example embodiments relate to a method of decrypting encrypted digital content.

In some example embodiments, the method includes reading the encrypted digital content and helper data from a memory array; measuring an analog value associated with a physical property of interested cells of the memory array; digitizing the measured analog value to generate an estimate of the response key; correcting the estimate of the response key using the helper data associated with the response key to reproduce the response key; generating a decryption key based at least on the response key; and decrypting the encrypted digital content based on the decryption key to generate unencrypted digital content.

In some example embodiments, the correcting the estimate of the response key includes determining if values of bits of the estimate of the response key are associated with an incorrect subset based on the helper data; and inverting the value of bits of the estimate of the response key, if the determining determines that the values are associated with the incorrect subset to reproduce the response key.

In some example embodiments, the method further includes reading a first hash from the memory array, the first hash being generated based on the unencrypted digital content; and selecting the interested cells from a memory array based on the first hash such that the interested cells whose analog voltage is measured are selected based on the unencrypted digital content.

In some example embodiments the generating a decryption key includes receiving one of a password and a personal identification number (PIN) from a user; calculating a second hash based on the one of the password and the PIN; and generating the decryption key by performing a logical operation between the first hash and the second hash to generate a result, determining the interested cells based on the result, and generating the decryption key based on a response of the interested cells.

In some example embodiments, the memory array is a NAND flash memory array, and the physical property is respective critical number of pulses of the interested cells of the memory array.

In some example embodiments the unencrypted content is a digital image.

At least some example embodiments relate to a secure storage device.

In some example embodiments, the device includes a memory array; and a processor, where the processor is configured to, measure an analog value associated with a physical property of interested cells of the memory array, digitize the measured analog value to generate a response key, generate an encryption key based at least on the response key, encrypt unencrypted digital content to generated encrypted digital content based on the response key, and store the encrypted digital content.

In some example embodiments, the device further includes a pulse generator configured to apply a plurality of voltage pulses to each of the interested cells of the memory array, and wherein the processor is configured to measure the analog value by determining which one of the plurality of applied voltage pulses turns on respective ones of the interested cells.

In some example embodiments, the processor is further configured to, calculate a first hash based on the unencrypted digital content, and select the interested cells from the memory array based on the first hash such that the interested cells whose analog voltage is measured are selected based on the unencrypted digital content.

In some example embodiments, the processor is configured to generate the encryption key by, receiving one of a password and a personal identification number (PIN) from a user calculating a second hash based on the one of the password and the PIN, and generating the encryption key by performing a logical operation between the first hash and the second hash to generate a result, determining the interested cells based on the result, and generating the decryption key based on a response of the interested cells.

In some example embodiments, the processor is further configured to, read the encrypted digital content and helper data from the memory array, remeasure the analog value associated with the physical property of the interested cells of the memory array, digitize the remeasured analog value to generate an estimate of the response key, correct the estimate of the response key using the helper data associated with the response key to reproduce the response key, generate a decryption key based at least on the response key, and decrypt the encrypted digital content based on the decryption key to generate the unencrypted digital content.

In some example embodiments, the processor is configured to generate the decryption key by, receiving one of a password and a personal identification number (PIN) from a user, calculating a second hash based on the one of the password and the PIN, and generating the decryption key by performing a logical operation between the first hash and the second hash to generate a result, determining the interested cells based on the result, and generating the decryption key based on a response of the interested cells.

In some example embodiments, the memory array is a NAND flash memory array, and the physical property is respective threshold voltages of the interested cells of the memory array.

In some example embodiments, the processor is configured to correct the estimate of the response key by, determining if values of bits of the response key are associated with an incorrect subset based on the helper data, and inverting the value of bits of the estimate of the response key, if the processor determines that the values are associated with the incorrect subset to reproduce the response key.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the embodiments.

FIG. 8 illustrates an example of utilizing digital data as a challenge to a flash based physical unclonable function F-PUF to generate a cryptographic key according to some example embodiments;

Figure 1:
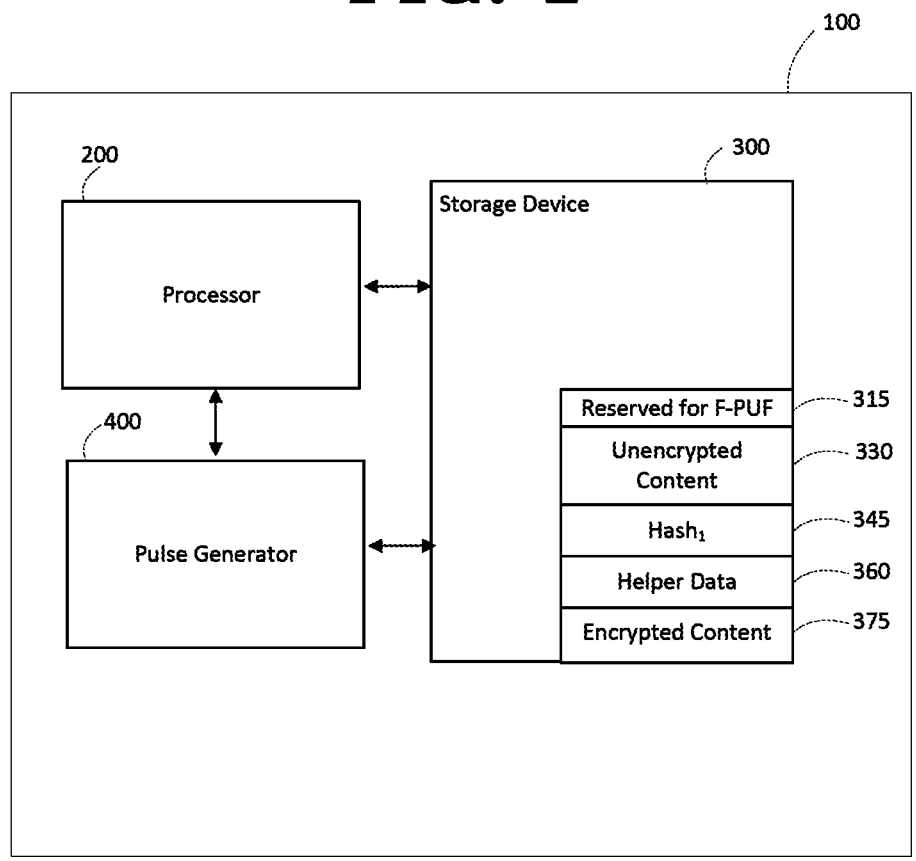
FIG. 1 illustrates a schematic block diagram of a secure storage device according to some example embodiments.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

FIG. 1 illustrates a secure storage device according to some example embodiments.

Referring to FIG. 1, a secure storage device 100 may include a processor 200, a storage device 300 and a pulse generator 400. However, example embodiments are not limited thereto. For example, in some example embodiments, the processor 200 and the storage device 300 may be included in separate devices connected thereto.

In some example embodiments, the processor 200 may be an arithmetic logic unit (ALU), a digital signal processor, a microcomputer, a field programmable gate array (FPGA), a programmable logic unit, a microprocessor or any other device capable of responding to and executing instructions in a defined manner.

The storage device 300 may be a non-transitory computer-readable medium. In some example embodiments, the storage device 300 may be a NAND flash array. However, example embodiments are not necessarily limited thereto. For example, the storage device 300 may be any permanent mass storage devices such as a random access memory (RAM), a read only memory (ROM), a disc drive, a floppy drive, a disc, a tape, a Digital Versatile Disc (DVD)/compact disc and a (CD)-ROM drive.

The storage device 300 may include memory cells, a row decoder and a column decoder (not shown).

As discussed below, certain ones of the memory cells may be a reserved section 315 of the storage device 300 that is reserved for creating a physical unclonable function (PUF) therefrom. However, example embodiments are not limited thereto. For example, when the storage device 300 is not a NAND flash array, the reserved section 315 may be a separate discrete NAND flash array storage device.

Further, as discussed in more detail below in regards to FIG. 4, other sections of the storage device 300 may temporarily store unencrypted content 330, and may permanently store a digest of a first hash ($Hash_1$) 345, helper data 360, and encrypted content 375.

Figure 4:
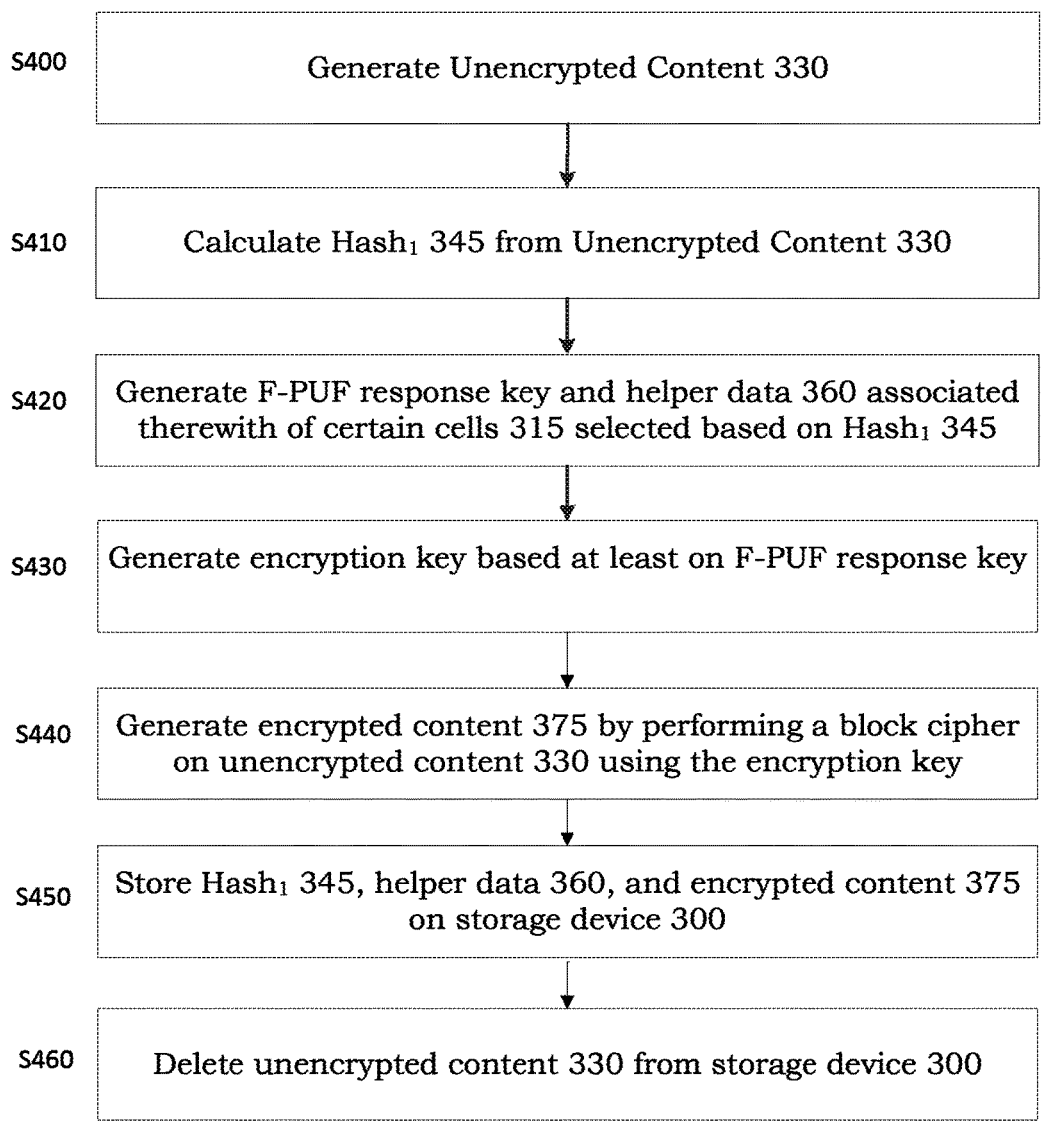
FIG. 4 illustrates a method of encrypting data using a cryptographic key based physical unclonable function F-PUF according to some example embodiments.
Figure 5:
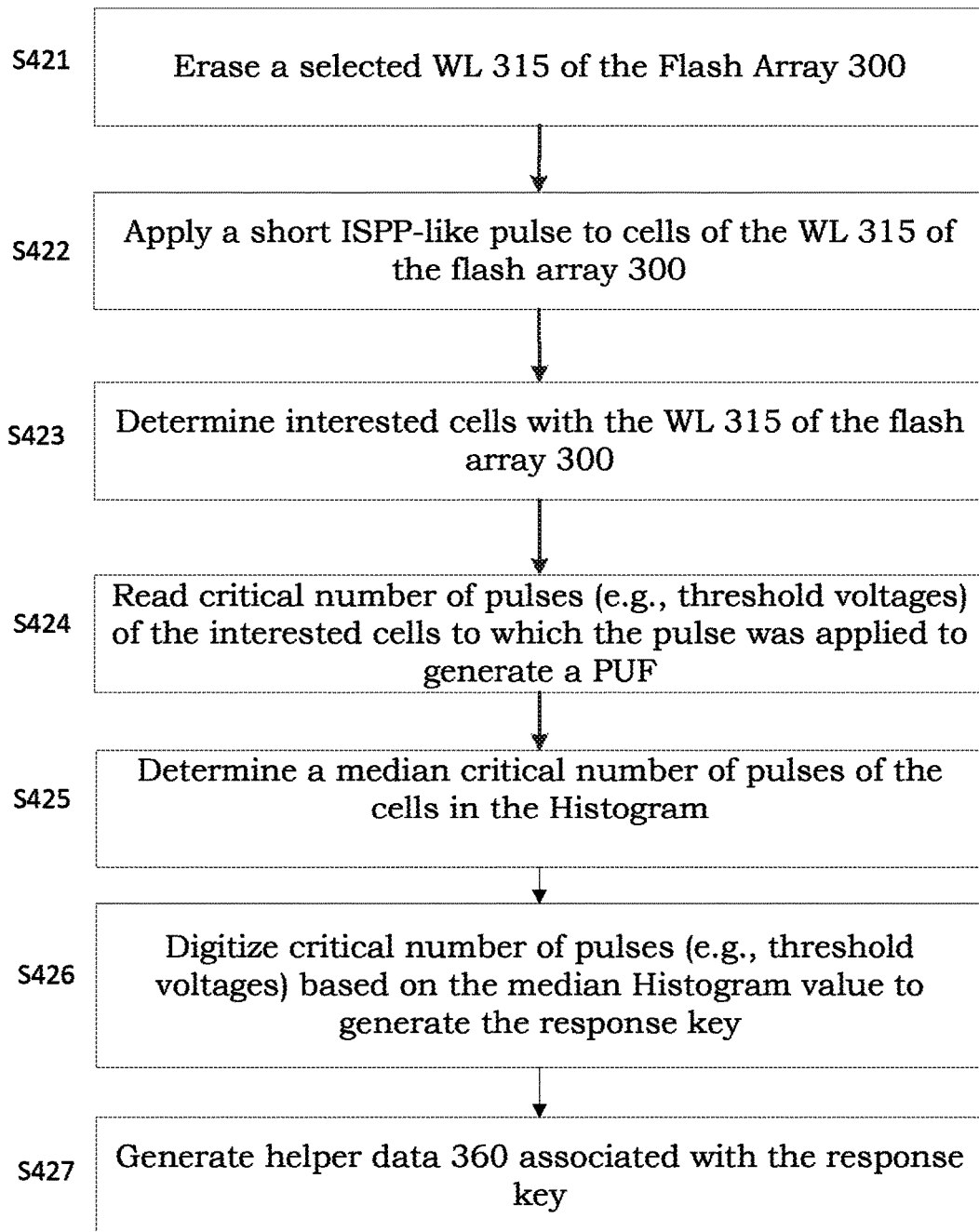
FIG. 5 illustrates a method of generating a physical unclonable function F-PUF response key and associated helper data according to some example embodiments.
Figure 7:
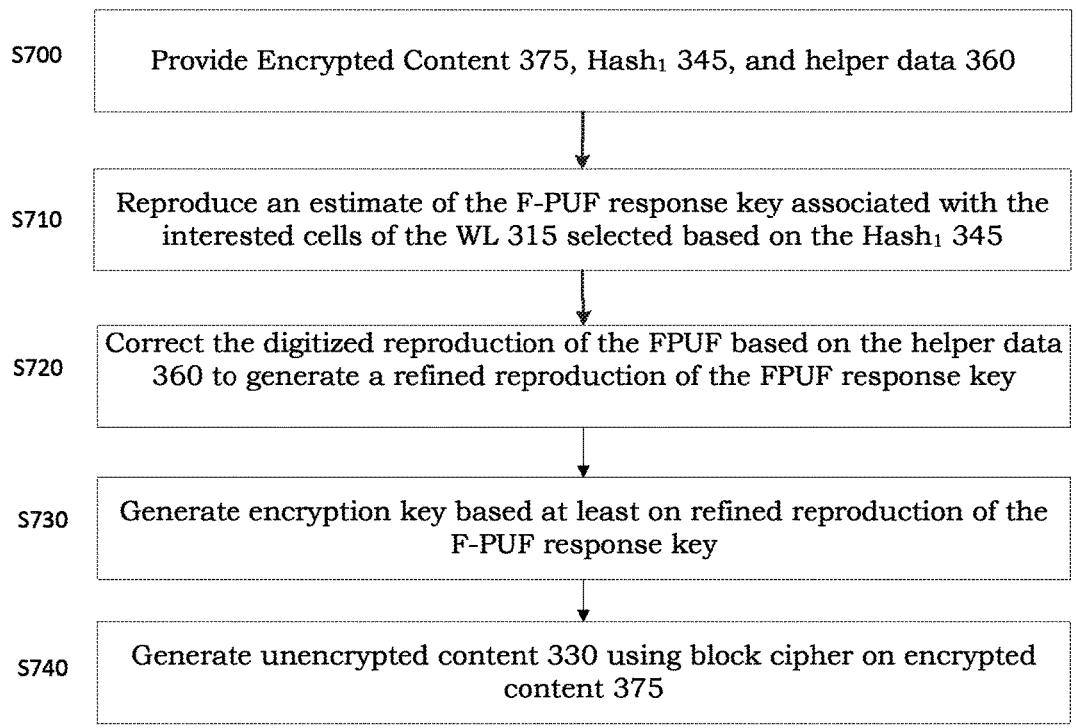
FIG. 7 illustrates a method of decrypting data using a cryptographic key generated from at least a physical unclonable function F-PUF response key according to some example embodiments.

The storage device 300 may also contain computer readable code that, when executed by the processor, configures the processor 200 as a special purpose computer to perform the operations illustrated in one or more of FIGS. 4, 5 and 7. For example, the storage device 300 may contain computer readable code that, when executed by the processor 200, configures the processor 200 to generate a cryptographic key and corresponding helper data, encrypt a digital file using the cryptographic key and to decrypt the digital file by reproducing the generated cryptographic key using the helper data.

The pulse generator 400 may be an incremental step pulse programming (ISPP) device. The ISPP device may perform partial or aborted programming of the storage device 300 by applying a gradually increasing program voltage to a word line of the storage device 300. The program voltage may gradually increase through a sequence of step increments until the program voltage reaches a level sufficient to properly program the target memory cell. In other example embodiments, rather than a sequence of step increments, only one or two pulses may be applied to reach a sufficient program voltage rather than gradually increasing the program voltage.

Figure 2:
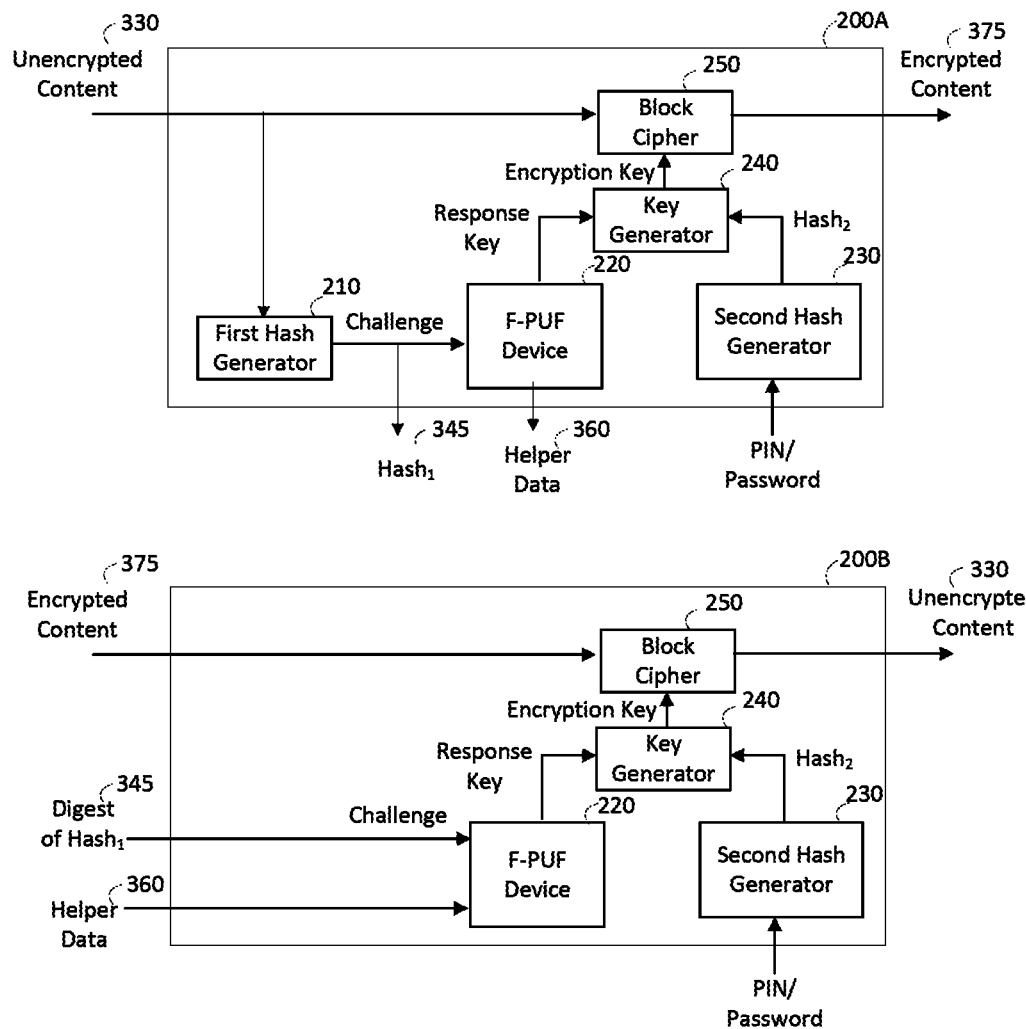
FIG. 2 is a functional illustration of a processor of a secure storage device according to some example embodiments.

FIG. 2 is a functional illustration of a processor of a secure storage device according to some example embodiments.

Referring to FIG. 2, the processor 200 may execute code that configures the processor 200 as one or more of an encrypting device 200A and a decrypting device 200B.

For example, the processor 200 may execute code that configures the processor 200 to perform the functions, discussed below with reference to FIGS. 4, 5 and 7, of one or more of a first hash generator 210, an F-PUF device 220, a second hash generator 230, a key generator 240, and a block cipher 250. However, example embodiments are not limited thereto. For example, in some example embodiments, the F-PUF device 220 may be a separate device having its own discrete processor and/or controller.

The F-PUF device 220 may perform partial or aborted programming of the reserved section 315 of the NAND flash array storage device 300 by applying, for example, a gradually increasing program voltage to a word line of the reserved section 315. The program voltage may gradually increase through a sequence of step increments until the program voltage reaches a level sufficient to properly program the target memory cell. In other example embodiments, rather than a sequence of step increments, only one or two pulses may be applied to reach a sufficient program voltage rather than gradually increasing the program voltage.

As discussed in more detail below, due to process variations, different cells in the reserved section 315 may require a different number of incremental step pulses to change their respective state and to reach a given voltage threshold. The secure storage device 100 may exploit these process variations by partially programming cells in the word line associated with the reserved section 315 to generate a unique fingerprint (e.g. a signature) based on the distribution of the different number of incremental step pulses to change a cell's respective state. This unique fingerprint may be used to encrypt and decrypt a digital document. A fingerprint may be considered unique if fingerprints from different chips and/or different locations of the same chip differ significantly.

In some example embodiments, the processor 200 generates various voltages necessary to perform the programming operation, the reading operation, and the erasing operation, and controls overall operations of the storage device 300. For example, the processor 200 may generate control signals for controlling respective operations of the row decoder and the column decoder associated with the storage device 300. In other example embodiments, when the F-PUF device 220 is a discrete device, a controller associated with the F-PUF device 220 may perform the aforementioned functions.

The row decoder may decode row control signals output by the processor 200, for example, row address signals, and may output a plurality of row selection signals according to a result of the decoding. The column decoder may decode a plurality of column control signals output by the processor 200 for example, column address signals, and may output a plurality of column selection signals according to a result of the decoding.

The storage device 300 may be a NAND flash array having various areas in which data is written by applying a voltage to a transistor associated therewith. The storage device 300 may include memory cells consisting of floating-gate transistors formed on points where word lines WL0 through WLm−1 and bit lines BL0 through BLn−1 cross each other. Here, m and n are natural numbers.

In some example embodiments, the NAND flash array 120 may be a 3D vertical NAND (for example, a VNAND) in which vertical NAND strings are vertically oriented such that at least one memory cell is located over another memory cell. The at least one memory cell may comprise a charge trap layer.

Figure 3:
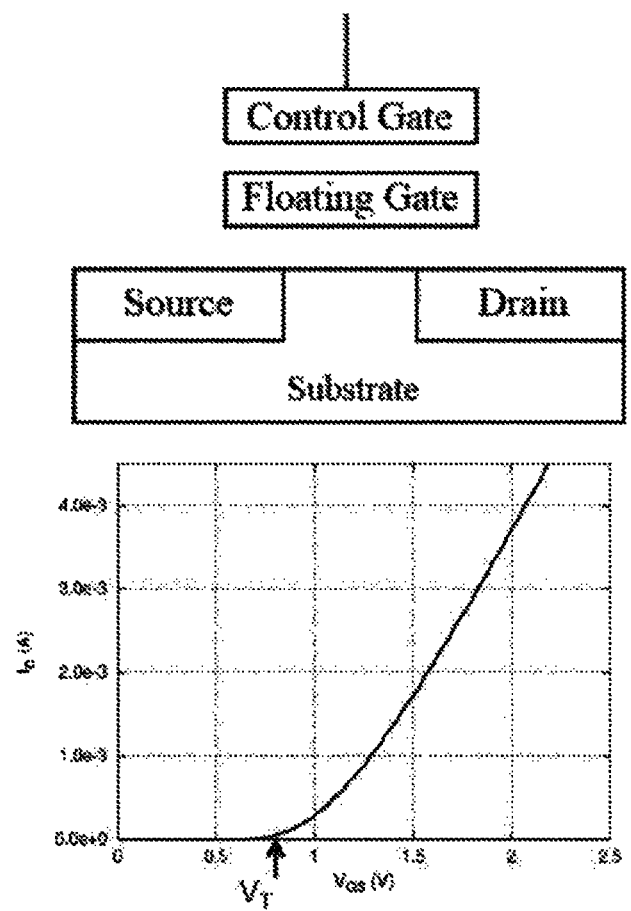
FIG. 3 illustrates a current response of a transistor to a gate source voltage applied thereto according to some example embodiments.

FIG. 3 illustrates a current response of a floating gate transistor to a gate source voltage applied thereto according to some example embodiments.

Referring to FIG. 3, a floating-gate transistor is a transistor with two gates between a source and a drain. The two gates include a control gate stacked on top of a floating gate that is electrically insulated due to an insulation conductor that is surrounded by oxide disposed between the control gate and a conductive channel.

The processor 200 may store data in the cells by selectively trapping negative charges on the floating gate. The trapped negative charge reduces the current flowing through the channel when the transistor is on. Thereafter, when reading data, the processor 200 may sense this current difference and translate the difference into an appropriate binary value.

In an n-type transistor, the conductive channel may not naturally exist between the source terminal and the drain terminal. Further, in a p-type transistor, the conductive channel may not naturally be wide enough for electrons to flow easily. Therefore, a gate-to-source voltage Vgs may be necessary to create the conductive channel between the source and the drain. The threshold voltage Vth of the floating-gate transistor is the minimum gate-to-source voltage differential needed to create a conductive channel sufficient to allow electrons to flow between the source and drain terminals of the floating-gate transistor.

The floating-gate transistors in the storage device 300 may have slightly different variations due to uncontrollable factors in the manufacturing process. For example, variations in doping concentrations, the thickness of the floating gate oxide, and the control-gate coupling ratio can cause variations in the threshold voltage of each transistor.

These variations may result in slight differences in threshold voltages. As a result, the amount of stored charge in the floating gate for a cell to reliably represent a "0" state varies from cell to cell.

In some embodiments, a setup procedure including an initial erase of the storage device 300 with subsequent ISPP-like procedure, of a number/location of cells in the WL 315 in the storage device 300 may be referred to as a "challenge", and the threshold (which may be represented by a number of the pulses in the ISPP-like procedure) may be called a "response". In other embodiments, a setup procedure including an initial erase of the NAND flash with subsequent application of a single pulse to a number/location of the cells in the WL 315 in the storage device 300 may be referred to as a "challenge", and the state of a given cell (which may become programmed in response to the single pulse, or, alternatively, may stay unprogrammed), may be referred to as the "response". The unpredictable (but repeatable) differences in the transistor's threshold voltages may be exploited as a physical stimulus used to create a Physical Unclonable Function (PUF) having a unique challenge-response behavior.

A flash memory provides three major operations: a read operation, an erase operation, and program (write) operation. These operations are performed in units, a page is the smallest unit in which data is read or written, and is usually 2 KB to 8 KB, while a block is the smallest unit of data which can be erased and is usually made up of several pages (e.g., 32-128 pages). Furthermore, as discussed in more detail below, the F-PUF flash package 100 may partially program one or more word lines of the NAND flash array 120, and, thereafter form a fingerprint based on the number of pulses (i.e. "the programming time") that was used to program the cells of these word lines.

However, due to the analog nature of PUF responses, the PUF responses are usually noisy. Therefore, it may be difficult to utilize the PUF responses directly as a cryptographic key.

Referring back to FIGS. 1 and 2, in an attempt to solve the problem of noise, during an encryption phase, in addition to generating a physical unclonable function (F-PUF) response key, the secure storage device 100 may also generate corresponding helper data 360 based on a PUF response. During a decryption phase, the secure storage device 100 may utilize the helper data 360 to reproduce the F-PUF response key from a subsequent PUF response.

As discussed in more detail below, in some example embodiments, this helper data may be "leaky" helper data which may reveal at least some information about the F-PUF response key. In other example embodiments, the helper data may be "non-leaky" helper data (NHD) which reveals little to no information about the F-PUF response key, as described in U.S. application Ser. No. 14/699,354, titled: Non-leaky helper data: extracting unique cryptographic key from noisy F-PUF fingerprint, the entire contents of which are hereby incorporated by reference.

FIG. 4 illustrates a method of encrypting data using a cryptographic key based physical unclonable function F-PUF according to some example embodiments;

Referring to FIGS. 1, 2 and 4, in operation S400, the processor 200 programmed as an encrypting device 200A may be provided with the unencrypted content 330. In some example embodiments, the processor 200 may generate the unencrypted content 330 by, for example, capturing a digital image. In other example embodiments, the processor 200 may retrieve pre-generated unencrypted content 330 from, for example, the storage device 300.

In operation S410, the processor 410 may generate the first hash (Hash$_1$) 345. For example, the processor 220 may function as the first hash generator 210 and generate the first hash Hash$_1$ 345 using a desired (or, alternatively, a predetermined) number of bits of the unencrypted content 330. In some example embodiments, the processor 200 may utilize the first 128 bits of the unencrypted content 330 as the first hash Hash$_1$ 345.

In operation S420, the processor 200 may generate a physical unclonable function (F-PUF) response key and corresponding helper data 360 by partially programing the reserved WL 315 of the storage device 300 and choosing which cells of the reserved WL 315 to read based on the first hash Hash$_1$ 345. Details on the generation of the F-PUF response key and the corresponding helper data 360 are discussed below with regard to FIG. 5.

In operation S430, the processor 200 perform the functions of a key generator 240 to generate an encryption key based on at least the F-PUF response key, or an any other key uniquely determined by the digital fingerprint of the device.

For example, in some example embodiments, the processor 200 may utilize the F-PUF response key as the encryption key.

In other example embodiments, the processor 200 may utilize both the F-PUF response key and a password (or, alternatively, a personal identification number (PIN), or any biometric data associated with the user) to generate the encryption key.

For example, the processor 200 may receive input from a user indicating the password or PIN associated with the user. The processor 200 may perform the functions of the second hash generator 230 and generate a second hash Hash$_2$ based on the password or PIN provided by the user. For example, the processor 200 may perform a hash function on the password (or, alternatively, the PIN, or biometric data) to map the same to a given number of bits. In some example embodiments, the processor 200 may generate the second hash Hash$_2$ by mapping the password or PIN or user's biometric data to 128, 256, 512 or any other number of bits, for example.

In some example embodiments, the processor 200 may generate the encryption key by performing an XOR function on the F-PUF response key and the second hash Hash$_2$. However, example embodiments are not limited thereto. For example, in other example embodiments, the processor 200 may perform other functions on the F-PUF response key and the second hash Hash$_2$ in order to produce the encryption key uniquely determined by the abovementioned inputs (e.g., the device specific fingerprint, PIN, password and/or biometric data).

In some example embodiments, the encryption key may be a symmetric-key such that the same key is used both for encrypting and decrypting the content. However, example embodiments are not limited thereto. In some example embodiments, the encryption key may be one of a 128-bit, 256-bit, 512-bit or other length cryptographic key.

In operation S440, the processor 200 may generate the encrypted content 375 by performing a block cipher on the unencrypted content 330 using the encryption key.

For example, in some example embodiments, the processor 200 may perform Advanced Encryption Standard (AES) encryption on the unencrypted content 330 using the encryption key as defined by the International Organization of Standards/International Electrotechnical Commission (ISO/IEC) 18033-3 standard.

AES is a symmetric encryption/decryption standard to encrypt plain text into cipher text, and decrypt the cipher text back into plain text in order to ensure document or other digital content security. The processor 200 may encrypt the unencrypted content 330 to 128-bit data blocks by performing the AES algorithm using the encryption key, which is generated based on the F-PUF response key, together with other inputs (e.g., the PIN, password and/or biometric data). To achieve this the processor 200 may use any operation mode, for example, a Cipher Block Chaining (CBC) mode, in which each block of plaintext is XORed with the previous ciphertext block before being encrypted.

In operation S450, the processor 200 may store the first hash Hash$_1$ 345, the helper data 360 and the encrypted content 375 on the storage device 300. However, example embodiments are not limited thereto. For example, the processor 200 may store the first hash Hash$_1$ 345, the helper data 360 on the storage device 300 prior to generating the encrypted content 375.

In operation S460, the processor 200 may delete the unencrypted content 330 from the storage device. In some example embodiments, the processor 200 may ensure that the unencrypted content 330 is removed from the storage device 300 by overwriting the unencrypted content 330 multiple times. In other example embodiments, the processor 200 may perform a Trim command on an area of the storage device 300 storing the unencrypted content 330.

As such, the encrypted content 375 generated by the secure storage device 100 may be binded to the secure storage device 100 since the secure storage device 100 generated the encryption key based, at least in part, on the distinct F-PUF response of the storage device 300.

FIG. 5 illustrates a method of generating a physical unclonable function (F-PUF) response key and associated helper data according to some example embodiments.

Referring to FIG. 5, in operation S421, the processor 200 may erase the reserved WL 315 of the NAND storage device 300.

In operation S422, the processor 200 may determine a number of short voltage pulses to utilize to program cells of the reserved WL 315 and instruct the pulse generator 400 to supply the determined number of short voltage pulses to the reserved word line WL 315. The processor 200 may determine the number of short voltage pulses to supply such that a sufficient amount of cells of the reserved WL 315 of the NAND flash array 300 will flip in response thereto. The sufficient amount of cells may be an amount of cells sufficient to generate enough data to generate the physical F-PUF response key. For example, the processor 200 may be preprogrammed in advance with the number of pulses to generate based on experimental data. After each pulse the processor 200 may perform full or partial read to detect a state of chosen cells of the reserved WL 315.

The processor 200 may determine the number of short pulses such that at least 90% of the cells in the reserved word line WL 315 have been programmed. In other example embodiments, the processor 200 may determine the number of short pulses such that that majority of the cells in the reserved word line WL 315 have been programmed.

In other example embodiments, rather than prove a short ISPP-like pulse, the processor 200 may only program the reserved word line WL 315 with a single pulse, perform a read operation and utilize the distribution of the cells that were programmed by this single pulse as the data.

In operation S423, the processor 200 may determine which cells with the reserved WL 315 are interested cells based on the first hash $Hash_1$ 345. For example, the first hash $Hash_1$ may define the cells of interest in the following manner: as one WL contains approximately 2^16 different cells, each 16 bits of the hash can uniquely determine the given cell number. Therefore, in order to have, for example, 256 cells uniquely defined by the non-encrypted content, the processor 200 may utilize 256*16 bits of the hash output.

In operation S424, the processor 200 may read data from the interested cells within the reserved word line WL 315 to determine which of the interested cells have passed the chosen threshold and record data indicating the number of pulses necessary to pass the chosen threshold for the each of the respective interested cells.

In some example embodiments, to prevent excessive flash wearing, the processor 200 may perform a "partial read operation" after each pulse sent to the reserved WL 315. The partial read operation may be an operation in which the processor 200 determines whether one of the interested cells is above or below a threshold without reading the actual value of the voltage stored in the cell. In other example embodiments, the processor 200 may perform a "full read operation" after each pulse. The full read operation may be an operation that includes a plurality of partial read operations.

For example, in some example embodiments the processor 200 may perform Algorithm I to partially program the reserved word line WL 315.

Algorithm 1:

Choose a number of pulses Np, initial voltage V0, ISPP_step, Number of the Block BlockNum, number of the Wordline WL and predefined voltage threshold Vt;

---

Ncells = number of cells in one WL;
Threshold[Ncells]; //
PartialReadResult[Ncells]; //
Erase_block(BlockNum);
for CellNum=1 to Ncells do {
  Threshold[CellNum]=−1;
}
For pulse_count = 1 to Np do {
    ISPP_program(BlockNum,WL,V0 + pulse_count*ISPP_step);
    Partial_read(BlockNum,WL,Vt);
    for CellNum=1 to N_cells do {
      If Threshold[CellNum]=−1 and PartialReadResult[CellNum]=1
        then Threshold[CellNum]=pulse_count // As the result,
/ /threshold number of pulses for each cell in WL are / /accumulated
in Threshold[CellNum]
    }
}

---

Although not illustrated in FIG. 5, based on the read operation, the processor 200 may determine whether a desired number of the interested cells have been programmed. For example, the processor 200 may determine whether there is enough data collected to generate the F-PUF. If the processor 200 determines that enough data has not been collected, the processor 200 may iteratively perform operations S421 to S424 with an increased number of voltage pulses until the desired number of cells have changed their states at some voltage threshold.

In operation S425, the processor 200 may determine the median critical number of pulses, necessary to program a cell (e.g., a programming time), of the interested cells in the reserved WL 315.

In operation S426, the processor 200 may digitize the determined critical number of pulses (programming time) of the given cells to generate the F-PUF response key.

For example, the processor 200 may assign either a zero "0" value or a one "1" value to bits of the key based on whether corresponding cells changed their states after a medium number of pulses. For example, the processor 200 may determine that interested cells, selected based on the first hash $Hash_1$ 345, that failed to change their states after the median number of pulses are assigned a zero "0" value in a corresponding bit of the F-PUF response key, while interested cells that changed their states within the median number of pulses, are assigned a one "1" value in the corresponding bit of the F-PUF response key.

However, example embodiments are not limited thereto. For example, the processor 200 may determine that interested cells that were slow and failed to change their state within the median number of pulses are assigned a "1" value and interested cells that were quick and changed their states within the median number of pulses are assigned a "0" value. Further, if in operation S422, the processor 200 only utilized a single pulse, than in operation S426, the processor 200 may digitize the data without comparison to a median value. For example, the processor 200 may assign a zero "0" value of the F-PUF response key to those interested cells that failed to change their states in response to the single pulse, and assign a one "1" value of the key to those interested cells that changed their states by this single pulse.

In operation S427, the processor 200 may generate the helper data 360 associated with the generated F-PUF response key.

As discussed below in more detail with regards to FIG. 7, the processor 200 may utilize the helper data during a subsequent decryption phase in which noise is present during the analog reading of the voltage level of the interested cells may cause the processor 200 to incorrectly interpret that certain ones of the interested cells have been partially programmed, and, therefore, assign an incorrect digital value to those interested cells. However, by the use of the helper data, the processor 200 may be able to determine that the digital value assigned to some of the interested cells is incorrect.

In some example embodiments, this helper data 360 may be leaky helper data, however, example embodiments are not limited thereto.

In some example embodiments, to generate the non-leaky helper data 360, the processor 200 may divide the threshold value into different subsets by splitting the Histogram of pulse threshold values into several regions, while each of these regions contains the same number of the interested cells of the reserved WL 315. The subsets may be designed such that at least two subsets associated with different digital values have a same helper data 360 assigned thereto. Therefore, the helper data 360 may be non-leaky such that the helper data 360 may not provide useful information to a hacker attempting to derive the F-PUF response key from the helper data 360 without having physical access to the secure storage device 100.

In other example embodiments, the helper data may be "leaky" helper data, and the processor 200 may generate the leaky helper data 360 by, for example, any error correction code. In some embodiments processor 200 may use BCH error correction code to generate the (leaky) helper data.

In operation S427, the processor 200 may store the generated helper data 360. For example, the controller 130 may store the helper data in a data register of the storage device 300. However, example embodiments are not limited thereto.

Figure 6:
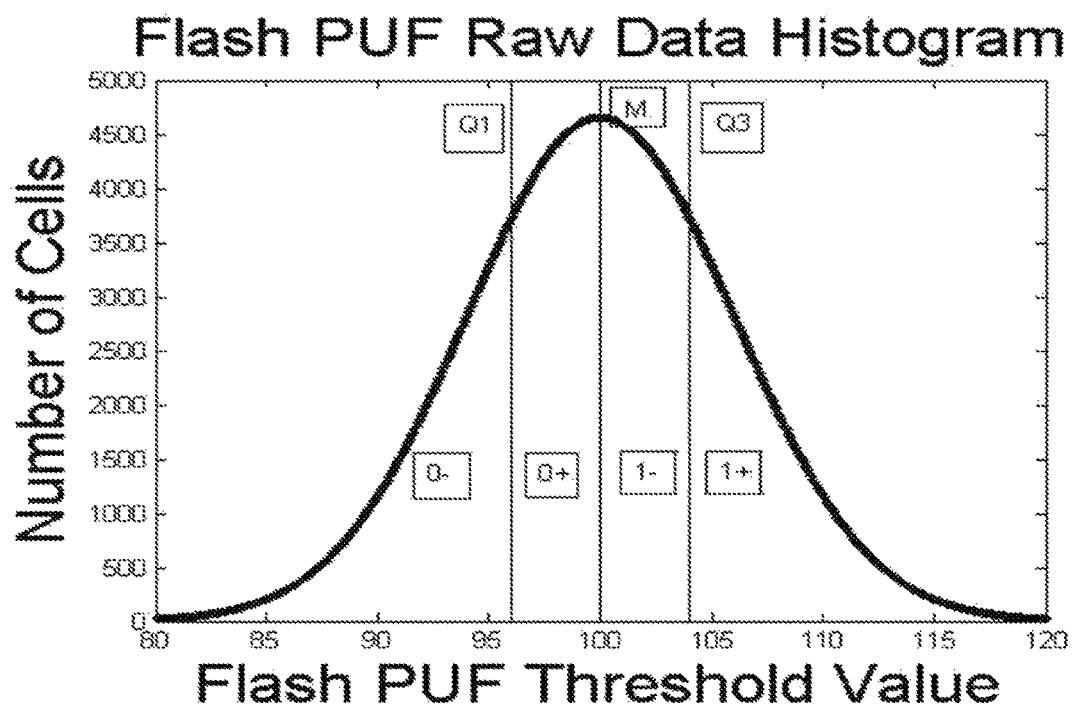
FIG. 6 illustrates an example of generating non-leaky helper data according to some example embodiments.

FIG. 6 illustrates an example of generating non-leaky helper data according to some example embodiments.

Referring to FIG. 6, the processor 200 may divide the histogram of PUF threshold values into an even number of subsets separated by quantiles. For example, as illustrated in FIG. 6, the processor 200 may normalize the distribution of the programming time of the interested cells of the reserved WL 315 and divide the normal distribution of PUF critical pulses number into four subsets "−0", "0+", "1−" and "1+" having three Quantiles "Q1", "M" and "Q3" therebetween, with the M Quantile being the median value of the critical pulses number (programming time). For example, as illustrated in FIG. 6, if the distribution is normalized, the medium value may be "100". However, example embodiments are not limited thereto.

The processor 200 may assign an interested cell, selected based on the first hash $Hash_1$ 345, to one of the subsets (for example, 0−, 0+, 1−, 1+ in FIG. 4) based on the programming time (e.g., the critical pulses number) associated with the interested cell.

As discussed below with regard to FIG. 7, during a subsequent decryption phase, noise present during the analog reading of the critical pulses number and voltage level of the interested cells may cause the processor 200 to incorrectly interpret that certain ones of the interested cells are programmed and, thus, lie on an opposite side of the median value M of the histogram, and, therefore, assign an incorrect digital value to those cells. However, by the use of the helper data 360, the processor 200 may be able to determine that the digital value assigned to some of the interested cells of the reserved WL 315 is incorrect.

Further, if the helper data 360 is non-leaky such that at least two of the four subsets having a same helper data 360 assigned thereto are associated with different digital values, while an equal number of interested cells are assigned to each of the subsets, the helper data may be non-leaky such that the helper data 360 may not provide useful information to a hacker attempting to derive the F-PUF response key from the helper data 360 without having physical access to the secure storage device 100.

FIG. 7 illustrates a method of decrypting data using a cryptographic key generated from at least a physical unclonable function F-PUF response key according to some example embodiments.

Referring to FIGS. 1, 2 and 7, in operation S700, the processor 200 programmed as a decryption device 200B may read the encrypted content 375, the first $hash_1$ 345, generated from the unencrypted content 330, and the helper data 360 from, for example, the storage device 300.

In operation S710, the processor 200 may reproduce an estimate of the F-PUF response key associated with the interested cells of the WL 315 that are selected based on the first $hash_1$ 345.

For example, in operation S710, the processor 200, may re-perform operations S421 to S425 to reproduce an estimate of the F-PUF response key. Repeated description of operations S421 to S425 will be omitted herein for the sake of brevity. For example, in an attempt to generate the same F-PUF as was utilized to generate the F-PUF response key, using the first $hash_1$ 345, the processor 200 may partially program the same interested cells with the same ISPP-like pulse during the decryption phase as were programmed during the encryption phase. However, in operation S424, the median value may be re-determined rather than using the same value determined during the encryption phase due to the fact that the threshold value of the interested cells of the reserved word line WL 315 may decrease over time because of the wearing of the cells in the flash memory.

During the decryption phase, noise contained in the analog measurements of the critical pulses number and voltages re-measured in operation S710 (e.g., the re-performing of operation S424 during the decryption phase) may have caused the processor 200 to incorrectly re-digitize the measurement during operation S710 (e.g., the re-performing of operation S426 during the decryption phase).

In operation S720, the processor 200 may correct the digital values generated in operation S710 with the aid of the helper data 360 and produce a refined estimate of the F-PUF response key. This refined estimated of the F-PUF response key may contain a smaller number of errors in comparison to a rough estimate obtained in operation S710.

For example, as discussed above, during the encryption phase, the processor 200 may translate the measured number of pulses corresponding to the threshold value of interested cells to corresponding digital key bits by assigning digital values to the key bits based on whether the number of pulses is above or below a Median value (100 in FIG. 6).

Thereafter, the processor 200 may determine helper data 360 associated with each of the key bits. For example, as discussed above, with reference to FIG. 6, the processor 200 may divide the histogram of the F-PUF threshold values into the several subsets each containing an approximately equal number of threshold values. The processor 200 may determine which subset the key bit is associated with based on the histogram.

For example, if the processor 200 determines that the threshold value of a bit is less or equal to Quantile1 (95.95 in FIG. 6), then the controller may assign a negative "−" helper bit to the bit of the F-PUF response key. If the processor 200 determines that the threshold value is more than Quantile1 and less than or equal to Median (100 in FIG. 6), the processor 130 may assign a positive "+" helper bit to the bit of the F-PUF response key. If the processor 200 determines that the threshold value is more than the Median, but less or equal to Quantile3 (104.05 in FIG. 6), the processor 200 may assign a negative "−" helper bit to the bit of the F-PUF response key, and, if the processor 200 determines that the threshold value is more than Quantile3 (104.05 in FIG. 6), the processor 200 may assign a positive "+" helper bit to the bit of the F-PUF response key.

Thereafter, each of the positive and negative helper data are assigned to both a zero "0" digital value and a "1" digital value in order to store the helper data in a suitable form and, therefore, build "non-leaky" helper data.

During the decryption phase, the processor 200 may determine if a threshold reading is close to the Median (i.e., if the threshold reading is between the M−R to M+R interval, where R is, for example, half the distance between Quantile1 Q1 and the Median M).

If the processor 200 determines that the threshold reading is close to the Median (i.e., between the M−R to M+R interval), then the controller may determine that the value may either be "0+" or "1−". Therefore, the processor 200 may utilize the helper data 360 to determine the correct value. For example, when the helper data 360 is negative "−", the processor 200 may determine that the reading was "1−", and thus the bit of the F-PUF response key is "1". Similarly, if the helper data 360 is positive "+", the processor 200 may determine that the bit of the F-PUF response key is "0".

If the processor 200 determines that the threshold reading is not close to the medium (i.e., outside M−R to M+R interval), the processor 200 may determine that the reading of the critical number of pulses (voltage) alone is reliable, and, therefore, the processor 200 may ignore the helper bit. For example, the processor 200 may compare the reading of the threshold voltage with the median value (M), and if reading is less than M, the processor 200 may determine that the bit of the F-PUF response key is "0" and if the reading is greater than or equal to the threshold value, the processor 200 may determine that the bit of the F-PUF response key is "1".

In operation S730, the processor 200 may re-generate the encryption key based on at least the refined reproduction of the F-PUF response key.

For example, the processor 200 may re-perform operation S430 to re-generate the encryption key. As discussed above with reference to FIG. 4, in some example embodiments, the processor 200 may utilize the F-PUF response key alone to generate the encryption key. In other example embodiments, the processor 200 may request a user of the secure storage device 100 to reenter the password (or, alternatively the PIN) used to encrypt the data, and may generate the encryption key based on both the F-PUF response key and a second hash $Hash_2$ of the password (or, alternatively the PIN). Repeated description of operation S430 will be omitted herein for the sake of brevity.

In operation S740, the processor 200 my decrypt the encrypted content 375 to reproduce the unencrypted content 330 by performing a block cipher on the encrypted content 375 using the encryption key.

For example, in some example embodiments, the processor 200 may perform Advanced Encryption Standard (AES) decryption on the AES encrypted content 375 using the encryption key.

Therefore, the secure storage device 100 may increase the security of content stored therein by making it difficult for a user of the secure storage device 100 to decrypt the encrypted content 375 on another device since the encryption scheme is based at least partially on a unique signature of the storage device 300 associated with the secure storage device 100, without the use of any special hardware changes to the flash memory contained therein.

FIG. 8 illustrates an example of utilizing digital data as a challenge to a flash based physical unclonable function F-PUF to generate a cryptographic key according to some example embodiments;

Referring to FIG. 8, during the encryption and decryption phases, the unencrypted content 330 may be used as a challenge to the F-PUF device 220 such that a first hash $Hash_1$ of the unencrypted content 330 may be used to select interested cells from a WL 315 of the storage device 300 to partially program.

For example, as illustrated in FIG. 8, the processor 200 may use the first hash $Hash_1$ to select cell numbers "22160", "6216", "27162" and "34829" from the WL 315 as the interested cells.

Thereafter, in operations S421 to S427, the processor 200 may read the aforementioned partially programmed interested cells, and determine that the F-PUF response key has a value of "0", "0", "1", and "0", respectively. Further, the processor 200 may determine that the helper data 360 corresponding to the first interested cell has a negative ("−") value, the helper data 360 corresponding to the second interested cell has a negative ("−") value, the helper data 360 corresponding to the third interested cell has a positive ("+") value, and the helper data corresponding to the fourth interested cell has a negative ("−") value.

In operations S430 and S730, the processor 200 may generate the encryption key based at least on the F-PUF response key.

In some example embodiments, the processor 200 may generate the second hash $Hash_2$ from a password (or, alternatively, a PIN) provided by a user of the secure storage device 100, and may use the F-PUF response key and the password to generate an encryption key.

For example, the processor 200 may determine that the second hash $Hash_2$ has a value of "1001", and may generate the encryption key by performing an XOR between the F-PUF response key and the second hash $Hash_2$ such that the encryption key has a value of "1011".

In some example embodiments, the first hash $Hash_1$ may define the cells of interest in the following manner: as one WL contains approximately 2^16 different cells, each 16 bits of the hash can uniquely determine the given cell number. So, in order to have, for example, 256 cells uniquely defined by the non-encrypted content, the hash output may need to be 256*16 bits. Therefore, in some example embodiments, the processor may use a Secure Hash Algorithm 3 (SHA-3) algorithm (e.g., a SHA3-256 algorithm) to generate 256*16 bits from the first hash $Hash_1$.

Therefore, the secure storage device 100 may generate the encryption key such that the encryption key is based off of the F-PUF response of cells of the storage device 300, and generate helper data that may be used to reproduce the F-PUF key, and, thus the encryption key, during a decryption phase.

Figure 9:
FIG. 9 illustrates an example of generating and reproducing a cryptographic key from a flash based physical unclonable function F-PUF without utilizing helper data according to some example embodiments.

FIG. 9 illustrates an example of generating and reproducing a cryptographic key from a flash based physical unclonable function F-PUF without utilizing non-leaky helper data according to some example embodiments.

Referring to FIGS. 1, 2, 4, and 9 during the encryption phase, the processor 200 may generate an F-PUF response key by programing the interested cells of the storage device 300 by applying a plurality of low voltage pulses thereto and digitizing the programming time (critical number of pulses). For example, the processor 200 may determine that the F-PUF response key is "01010110 10010000 00011000 01001000 01101010 00011010 10001000 00001101".

Subsequently, during the decryption phase, the processor 200 may attempt to reproduce the F-PUF response key by again applying a plurality of low voltage pulses to the same interested cells of the storage device 300 and digitizing the subsequent programming time. However, the PUFs used to generate the original and reproduced F-PUF response key may have had noise associated therewith due to the analog measurements of the voltage. For example, the reproduced key may be "01010111 11010000 00011100 00001000 01101110 00001010 10001000 00001101". Therefore, as illustrated by the underlined values of the reproduced F-PUF response key in FIG. 9, there may be mismatches between the originally generated F-PUF response key and the reproduced F-PUF response key. Such mismatches may result in the inability to properly decrypt the encrypted content 375.

Figure 10:
FIG. 10 illustrates an example of generating and reproducing a cryptographic key from a flash based physical unclonable function F-PUF utilizing helper data to remove noise therein according to some example embodiments.

FIG. 10 illustrates an example of generating and reproducing a cryptographic key from a flash based physical unclonable function F-PUF utilizing helper data to remove noise therein according to some example embodiments.

Referring to FIGS. 1, 2, 6, 7, and 10, during the encryption phase, in addition to generating the F-PUF response key, the processor 200 may also generate helper data 360 that is associated with the F-PUF response key. For example, the processor 200 may quantize the distribution of the programming times (critical number of pulses) of the cells in a WL, such that the programming time distribution for all cells in a given word line WL is split into several regions such that each of the regions contains the same number of the cells, and map the programming time of the each given cell into one of the regions.

For example, as illustrated in FIG. 6, for interested cells, selected based on the first hash $Hash_1$ 345, having a programming time that is very low and falls within a first subset, which is below line "Q1", the processor 200 may assign a negative "−" value to the helper data 360 associated with the interested cells. For each of the interested cells having a programming time that is lower than the median programming time M but within the second subset 0+, between Quantiles Q1 and M, the processor 200 may assign a positive "+" value to the helper data 360 associated with the interested cells. For each of the interested cells having programming times that is greater than the median programming time M but within the third subset 1−, between line M and Quantile Q3, the processor 200 may assign a negative "−" value to the helper data 360 associated with the interested cells. Additionally, for each of the cells having programming times that are relatively high and fall within the fourth subset 1+, which is greater than Quantile "Q3", the processor 200 may assign a positive "+" value to the helper data 360 associated with the interested cells.

Subsequently, during the decryption phase, the processor 200 may attempt to reproduce the F-PUF response key by digitizing a subsequent analog measurement of the programming time by again applying a plurality of low voltage pulses to the interested cells of the flash memory array 130. However, as discussed above, the PUFs used to generate the original and reproduced F-PUF response key may have had noise associated therewith due to the analog measurements of the voltages to determine the programming time. However, in one or more example embodiments, the processor 200 may utilize the helper data 360 generated during the encryption phase in an attempt to match the reproduced F-PUF response key with the originally generated F-PUF response key.

For example, as illustrated in FIG. 10, in the encryption phase, the processor 200 may determine that the threshold value for the eighth bit is slightly less than Median M, and therefore, the processor 200 may assign a zero to the eighth bit.

As discussed above with reference to FIG. 9, in the decryption phase, due to noise in the reading of the threshold value, the controller 130 may determine that the eighth bit of the key is one "1" because the noise may cause the threshold value that was slightly less than the Median M to incorrectly be read as slightly larger than Median M).

However, because the helper data 360 associated therewith that was determined in the encryption phase is positive "+", the threshold value may only belong to the second subset 0+ between Quantiles Q1 and M, or, the fourth subset 1+ higher Quantile Q3. However, since the threshold value of the eighth bit is near the median M, the processor 200 may determine that the threshold belongs to the second subset 0+, which is located between Quantiles Q1 and M, and, therefore, that is eighth bit of the F-PUF response key is zero "0" with positive "+" helper data 360.

Therefore, using the helper data 360, the processor 200 may be able to correct a significant amount of errors present in the reproduced estimate of the F-PUF response key.

Figure 11:
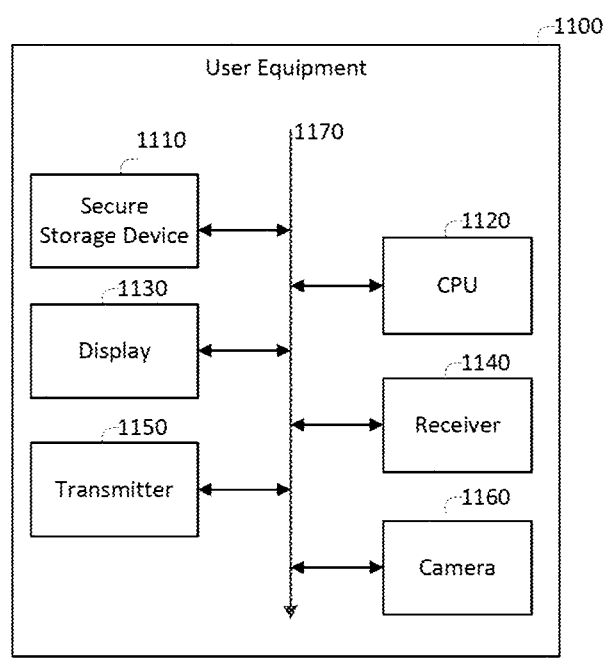
FIG. 11 illustrates user equipment containing a secure storage device according to some example embodiments.

FIG. 11 illustrates user equipment containing a secure storage device according to some example embodiments.

As illustrated in FIG. 11, user equipment 1100 may include one or more of a secure storage device 1110, a Central Processing Unit (CPU) 1120, a display 1130, a receiver 1140, a transmitter 1150, a camera 1160, and a data bus 1170 that handles communication therebetween.

The secure storage device 1110 may generate encrypted content 375 such that the encrypted content is bound to the user equipment 1100 by encrypting the content using at least an F-PUF response key during an encryption phase and reproducing the F-PUF key using helper data during a decryption phase. Therefore, the secure storage device 1100 may generate encrypted content 375 that limits the distribution thereof without the use of any special hardware changes to the flash memory contained therein.

The display 1130 may display information to a user under the control of the CPU 820.

The receiver 1140 and transmitter 1150 may receive and transmit signals, respectively under the control of the CPU 1120. The receiver 1140 and transmitter 1150 may include hardware and any software for transmitting and receiving wireless signals, respectively, including, for example, data signals, control signals, and signal strength/quality information via one or more wireless connections to other network elements.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

We claim:

1. A method of encrypting unencrypted digital content, the method comprising:
    calculating a first hash based on the unencrypted digital content;
    selecting interested cells from a memory array based on the first hash;
    measuring an analog value associated with a physical property of the interested cells of the memory array;
    digitizing the measured analog value to generate a response key;
    generating an encryption key based at least on the response key;
    encrypting the unencrypted digital content to generate encrypted digital content based on the encryption key; and
    storing the encrypted digital content.

2. The method of claim 1, further comprising:
    quantizing the measured analog value to generate helper data corresponding to the response key; and
    storing the helper data.

3. The method of claim 1, wherein the measuring an analog value comprises:
applying a plurality of voltage pulses to each of the interested cells of the memory array; and
determining which one of the plurality of applied voltage pulses turns on respective ones of the interested cells.

4. The method of claim 1, wherein
the memory array is a NAND flash memory array, and
the physical property is respective critical number of pulses of the interested cells of the memory array.

5. The method of claim 1, wherein the generating an encryption key comprises:
receiving one of a password and a personal identification number (PIN) from a user;
calculating a second hash based on the one of the password and the PIN; and
generating the encryption key by,
performing a logical operation between the first hash and the second hash to generate a result,
determining the interested cells based on the result, and
generating the encryption key based on a response of the interested cells.

6. A method of decrypting encrypted digital content, the method comprising:
reading the encrypted digital content, helper data, and a first hash from a memory array,
the first hash being generated based on the unencrypted digital content;
selecting interested cells from the memory array based on the first hash;
measuring an analog value associated with a physical property of the interested cells of the memory array;
digitizing the measured analog value to generate an estimate of a response key;
correcting the estimate of the response key using the helper data associated with the response key to reproduce the response key;
generating a decryption key based at least on the response key; and decrypting the encrypted digital content based on the decryption key to generate unencrypted digital content.

7. The method of claim 6, wherein the correcting the estimate of the response key comprises:
determining if values of bits of the estimate of the response key are associated with an incorrect subset based on the helper data; and
inverting the value of bits of the estimate of the response key, if the determining determines that the values are associated with the incorrect subset to reproduce the response key.

8. The method of claim 7, wherein
the memory array is a NAND flash memory array, and
the physical property is respective a critical number of pulses of the interested cells of the memory array.

9. The method of claim 6, wherein the generating a decryption key comprises:
receiving one of a password and a personal identification number (PIN) from a user;
calculating a second hash based on the one of the password and the PIN; and
generating the decryption key by,
performing a logical operation between the first hash and the second hash to generate a result,
determining the interested cells based on the result, and
generating the decryption key based on a response of the interested cells.

10. The method of claim 6, wherein the unencrypted content is a digital image.

11. A secure storage device, the device comprising:
a memory array; and
a processor configured to,
calculate a first hash based on unencrypted digital content,
select interested cells from the memory array based on the first hash,
measure an analog value associated with a physical property of the interested cells of the memory array,
digitize the measured analog value to generate a response key,
generate an encryption key based at least on the response key,
encrypt the unencrypted digital content to generate encrypted digital content based on the response key, and
store the encrypted digital content.

12. The device of claim 11, further comprising:
a pulse generator configured to apply a plurality of voltage pulses to each of the interested cells of the memory array, and wherein
the processor is configured to measure the analog value by determining which one of the plurality of applied voltage pulses turns on respective ones of the interested cells.

13. The device of claim 11, wherein the processor is configured to generate the encryption key by,
receiving one of a password and a personal identification number (PIN) from a user,
calculating a second hash based on the one of the password and the PIN, and
generating the encryption key by,
performing a logical operation between the first hash and the second hash to generate a result,
determining the interested cells based on the result, and
generating the encryption key based on a response of the interested cells.

14. The device of claim 11, wherein the processor is further configured to,
read the encrypted digital content, helper data, and the first hash from the memory array,
remeasure the analog value associated with the physical property of the interested cells of the memory array,
digitize the remeasured analog value to generate an estimate of the response key,
correct the estimate of the response key using the helper data associated with the response key to reproduce the response key,
generate a decryption key based at least on the response key, and
decrypt the encrypted digital content based on the decryption key to generate the unencrypted digital content.

15. The device of claim 14, wherein the processor is configured to generate the decryption key by,
receiving one of a password and a personal identification number (PIN) from a user,
calculating a second hash based on the one of the password and the PIN, and
generating the decryption key by,
performing a logical operation between the first hash and the second hash to generate a result,
determining the interested cells based on the result, and
generating the decryption key based on a response of the interested cells.

16. The device of claim 14, wherein the processor is configured to correct the estimate of the response key by,
- determining if values of bits of the response key are associated with an incorrect subset based on the helper data, and
- inverting the value of bits of the estimate of the response key, if the processor determines that the values are associated with the incorrect subset to reproduce the response key.

17. The device of claim 11, wherein
- the memory array is a NAND flash memory array, and
- the physical property is respective critical number of pulses of the interested cells of the memory array.

* * * * *